(12) United States Patent
Huang et al.

(10) Patent No.: US 8,261,298 B2
(45) Date of Patent: Sep. 4, 2012

(54) DISK LOADING DEVICE OF SLOT-IN OPTICAL DISK DRIVE

(75) Inventors: Chien-Wei Huang, Hsinchu (TW);
Ta-Hsiang Wang, Hsinchu (TW);
Sheng-Hsiung Chou, Hsinchu (TW);
Chia-Hsing Chao, Hsinchu (TW)

(73) Assignee: Philips & Lite-On Digital Solutions Corp., Taipei (TW)

( * ) Notice: Subject to any disclaimer, the term of this patent is extended or adjusted under 35 U.S.C. 154(b) by 274 days.

(21) Appl. No.: 12/777,450

(22) Filed: May 11, 2010

(65) Prior Publication Data

US 2010/0299684 A1 Nov. 25, 2010

(30) Foreign Application Priority Data

May 21, 2009 (CN) .......................... 2009 1 0138970

(51) Int. Cl.
*G11B 17/04* (2006.01)

(52) U.S. Cl. ........................................ 720/623; 720/704

(58) Field of Classification Search .......... 720/620–623, 720/704
See application file for complete search history.

(56) References Cited

U.S. PATENT DOCUMENTS

| | | | | |
|---|---|---|---|---|
| 4,498,162 A | * | 2/1985 | Schatteman | 720/620 |
| 4,674,079 A | * | 6/1987 | Agostini | 720/623 |
| 5,113,388 A | * | 5/1992 | Yamada et al. | 720/704 |
| 6,198,713 B1 | * | 3/2001 | Sakurai et al. | 720/608 |
| 6,256,280 B1 | * | 7/2001 | Sakurai et al. | 720/620 |
| 7,120,919 B2 | * | 10/2006 | Kuo | 720/620 |
| 7,281,255 B2 | * | 10/2007 | Kuo | 720/623 |
| 7,302,695 B2 | * | 11/2007 | Lee et al. | 720/622 |
| 7,774,803 B2 | * | 8/2010 | Sawai et al. | 720/625 |
| 7,840,972 B2 | * | 11/2010 | Ahn et al. | 720/623 |
| 7,934,225 B2 | * | 4/2011 | Kuo et al. | 720/645 |
| 7,937,719 B2 | * | 5/2011 | Akama et al. | 720/623 |
| 7,987,474 B2 | * | 7/2011 | Wang et al. | 720/623 |
| 8,146,113 B2 | * | 3/2012 | Fujisawa et al. | 720/623 |
| 8,146,114 B2 | * | 3/2012 | Susumago | 720/651 |
| 2003/0227856 A1 | * | 12/2003 | Kim et al. | 369/77.1 |
| 2004/0148618 A1 | * | 7/2004 | Tsuchiya | 720/621 |
| 2005/0198656 A1 | * | 9/2005 | Yamamoto et al. | 720/616 |
| 2006/0048173 A1 | * | 3/2006 | Lee et al. | 720/658 |
| 2006/0064707 A1 | * | 3/2006 | Yang et al. | 720/623 |
| 2006/0143626 A1 | * | 6/2006 | Hu | 720/619 |
| 2006/0143631 A1 | * | 6/2006 | Watanabe | 720/621 |
| 2006/0212885 A1 | * | 9/2006 | Onuma et al. | 720/622 |
| 2008/0163273 A1 | * | 7/2008 | Eguchi | 720/623 |

* cited by examiner

*Primary Examiner* — Brian Miller
(74) *Attorney, Agent, or Firm* — Thomas, Kayden, Horstemeyer & Risley, LLP

(57) ABSTRACT

A disk loading device of a slot-in optical disk drive comprises two loading levers to load and eject a disk, wherein the two loading levers are connected to a pivot pin; and a guide slot having a right recess and a left recess, wherein the pivot pin is moveable along the guide slot.

6 Claims, 9 Drawing Sheets

DISK LOADING DEVICE OF SLOT-IN OPTICAL DISK DRIVE

BACKGROUND OF THE INVENTION

1. Field of the Invention

The present invention relates to a slot-in optical disk drive, particularly one that relates to a loading device of the slot-in optical disk drive.

2. Description of the Prior Art

With the technology of electronic and mechanical industries continue to develop and progress, the quality of computer peripherals such as hard drives, disk drives, scanners, printers and so on are becoming better. As far as the storage medium of the disk drive is concerned, the disk has evolved from the 700 MB storage capacity of traditional CD (compact disk) to the 4.7 GB storage capacity of the DVD (digital versatile disk). As these types of disks are capable of storing data in very long term, they have become the mainstream of the market for storing data and something that every consumer must have.

Current disk drives use either a tray-loading mechanism, by which disk is loaded or ejected is relied on the tray moving inward or outward of the inlet of the disk drive, or a slot-in mechanism, by which the disk is slid into a slot and then drawn in further by disk loading device. The disadvantage of the slot-in mechanism is that, as a result of having no tray to let the user to align the center of the disk with the center of the spindle, the disk may not be smoothly loaded into the disk drive, e.g. the disk may get stuck on the loading path.

Please refer to FIG. 1 and FIG. 2. FIG. 1 shows the mechanism of a conventional slot-in optical disk drive, which comprises a slot inlet 15, a motor 21, a transmission unit 23, a slide plate 30, a left loading lever 20L, and a right loading lever 20R. The inner end of the two loading levers 20L and 20R are pivoted on a pivot pin 13, which can move along a guide slot 10.

When a user pushes a disk into the slot inlet 15, the left loading lever 20L and the right loading lever 20R will, at the touch of the disk, recede and open wide, causing the pivot pin 13 to move toward the slot inlet 15 along the guide slot 10. After the disk is pushed into a certain depth, the motor 21 is then activated, which, via the transmission unit 23, brings the slide plate 30 to move to the left. The slide plate 30 is provided with a first guide track 31 and a second guide track 32. When a 12 cm disk is loaded, the two loading levers 20L and 20R will open wide apart as a result of the larger contact angle with the disk and the pivot pin 13 has a longer downward travel. Thus when the slide plate 30 is driven leftward, the pivot pin 13 will move along the first guide track 31. In the same way, when an 8 cm disk is loaded, the two loading levers 20L and 20R will open. However, the span angle will be smaller and the pivot pin 13 has a shorter downward travel. Thus when the slide plate 30 is driven leftward, the pivot pin 13 will move along the second guide track 32.

After the motor 21 is activated, the slide plate 30 will be driven, through the transmission unit 23, to move to the left and the pivot pin 13 moves along the first guide track 31 or the second guide track 32. As it is confined in the guide track 31 or 32, the pivot pin 13 also moves along the guide slot 10 downward and upward, so that the left loading lever 20L and the right loading lever 20R will bring the disk to a predetermined position.

However, if a user does not place a small disk (8 cm disk) in the middle between the two loading levers 20L and 20R, then only one of the loading levers will be touched and activated, i.e, when the disk is placed more to the left, then only the left loading lever 20L will be touched and activated, and vice versa. Hence, when the transmission unit 23 started to drive the slide plate 30, the disk will get stuck in the drive because the uneven push force of the two loading levers 20L and 20R may not be able to push the disk into the predetermined position.

SUMMARY OF THE INVENTION

In view of the above, an object of the present invention is to create a disk loading device that can automatically bring a disk to the appropriate position, so that the disk will never get stuck on the way of loading process as a result of off-center position or improper placement.

The present invention discloses a disk loading device of a slot-in optical disk drive. The device comprises two loading levers for loading and ejecting a disk and the two loading levers are pivoted on a pivot pin; a guide slot, which is formed with a left recess and a right recess, in which the pivot pin can move along the guide slot.

The disk loading device of the present invention further comprises a plate, which assumes to be at either one of two positions: first position and second position in the device. When the fender is at first position, it shields at least some part of the recesses. When the plate moves to second position, it leaves the recesses unshielded.

In the first preferred embodiment of the invention, the plate has a slim window. The width of a first section of the slim window is larger than the maximum width of the guide slot, while a second section is smaller than the maximum width of the guide slot but is larger than the diameter of the pivot pin.

In the second preferred embodiment of the invention, the plate has a U groove and moves linearly along the guide slot. The width of the U groove is about the width of the guide slot.

In the third preferred embodiment of the invention, the plate comes with a U groove which has a portion cut at a position corresponding to the guide slot and a remaining portion of the U groove shields one of the recesses when the plate is at first position.

In the fourth preferred embodiment of the invention, the plate comes with a spike that shields one of the recesses when the plate is at first position.

DESCRIPTION OF THE PREFERRED EMBODIMENT

In the following description, the direction related wording: "inward", indicated a moving direction is toward an internal of the optical disk drive, and the "outward" indicated a moving direction is toward inlet of the optical disk drive, and "left", and "right" represent the paper direction marked in their referenced figures.

Figure 1:
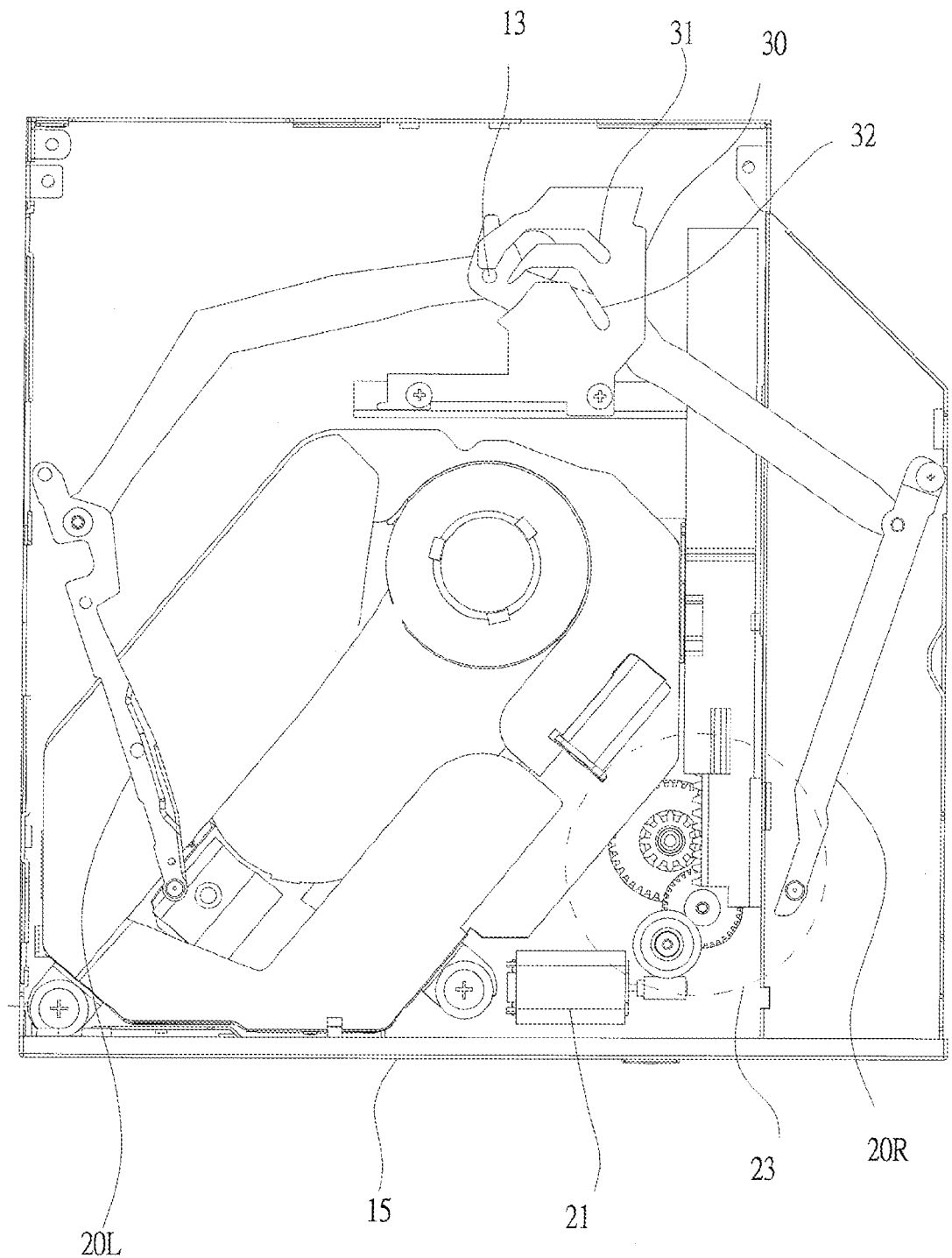
FIG. 1 shows a conventional slot-in optical disk drive.
Figure 2:
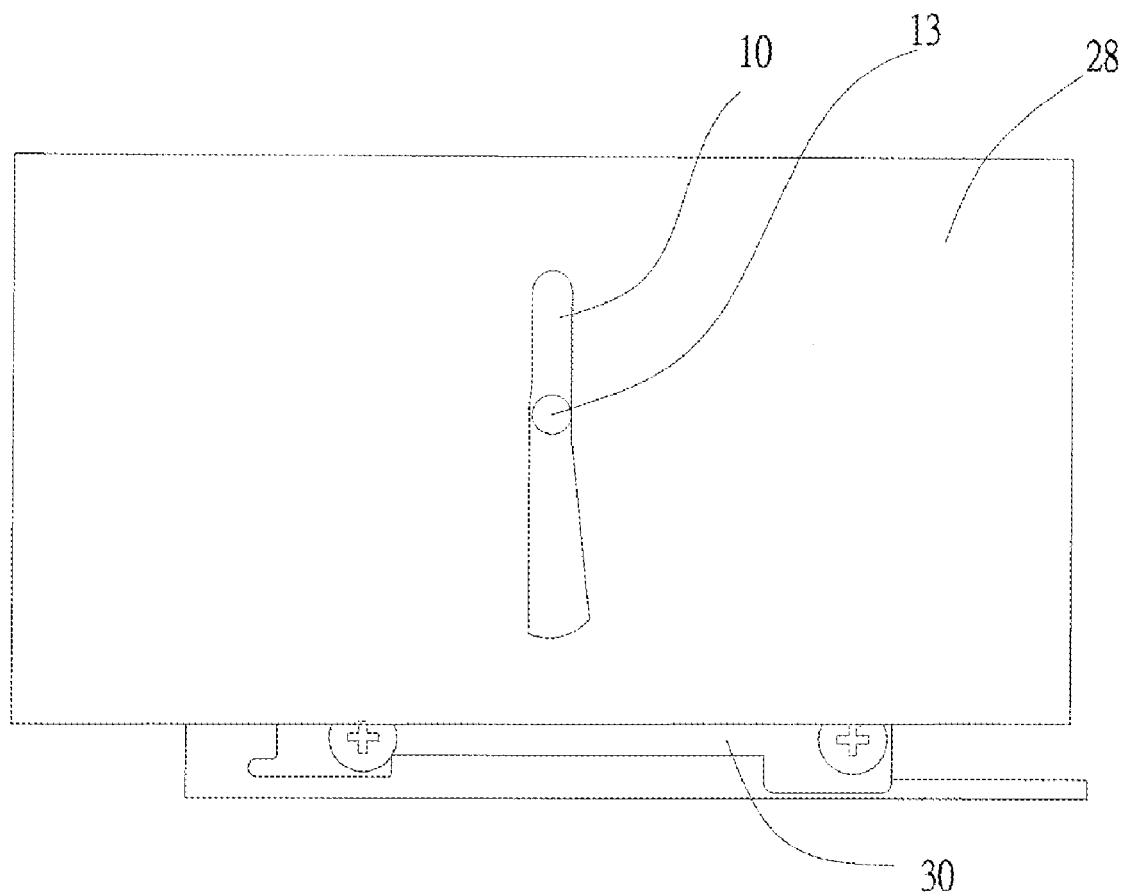
FIG. 2 shows the guide slot of a prior art slot-in optical disk drive.
Figure 3:
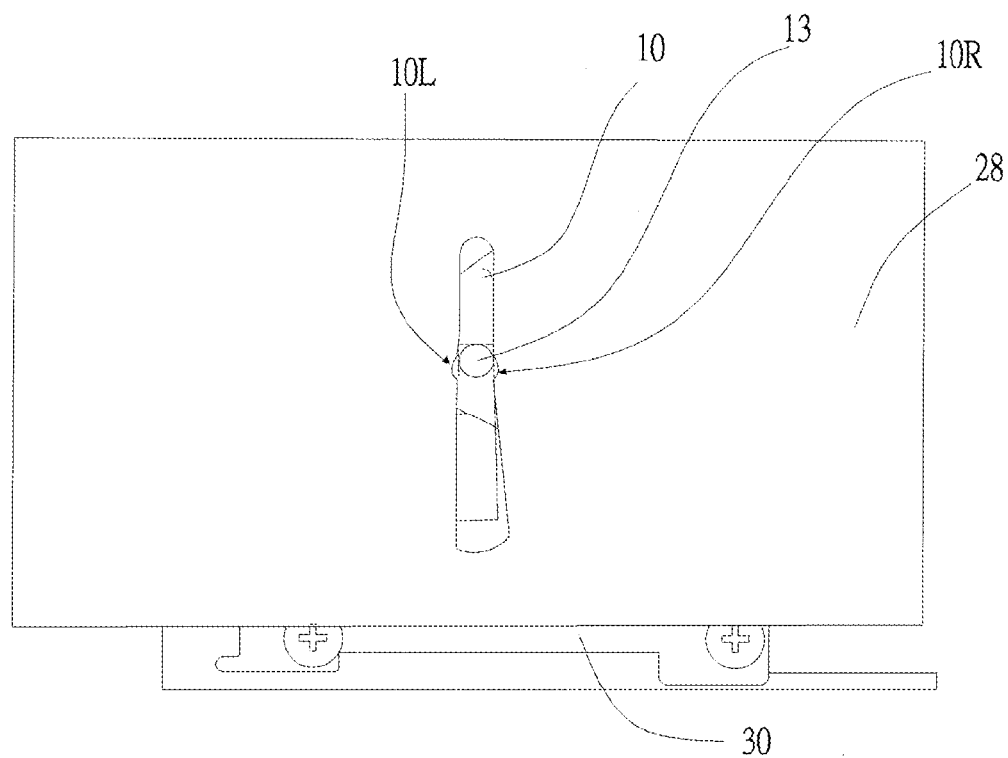
FIG. 3 shows the guide slot of the present invention.
Figure 4:
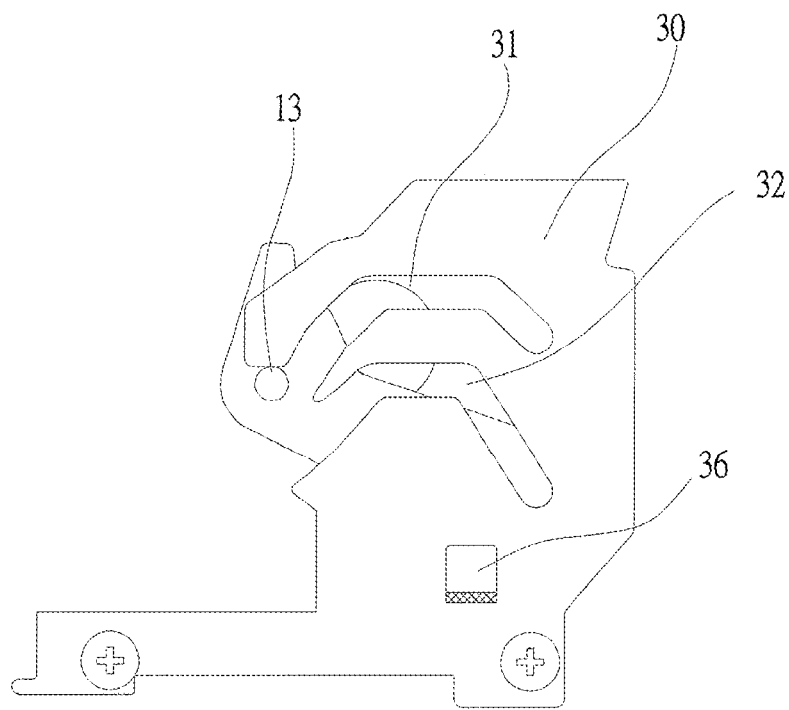
FIG. 4 shows the slide plate of the present invention.
Figure 5:
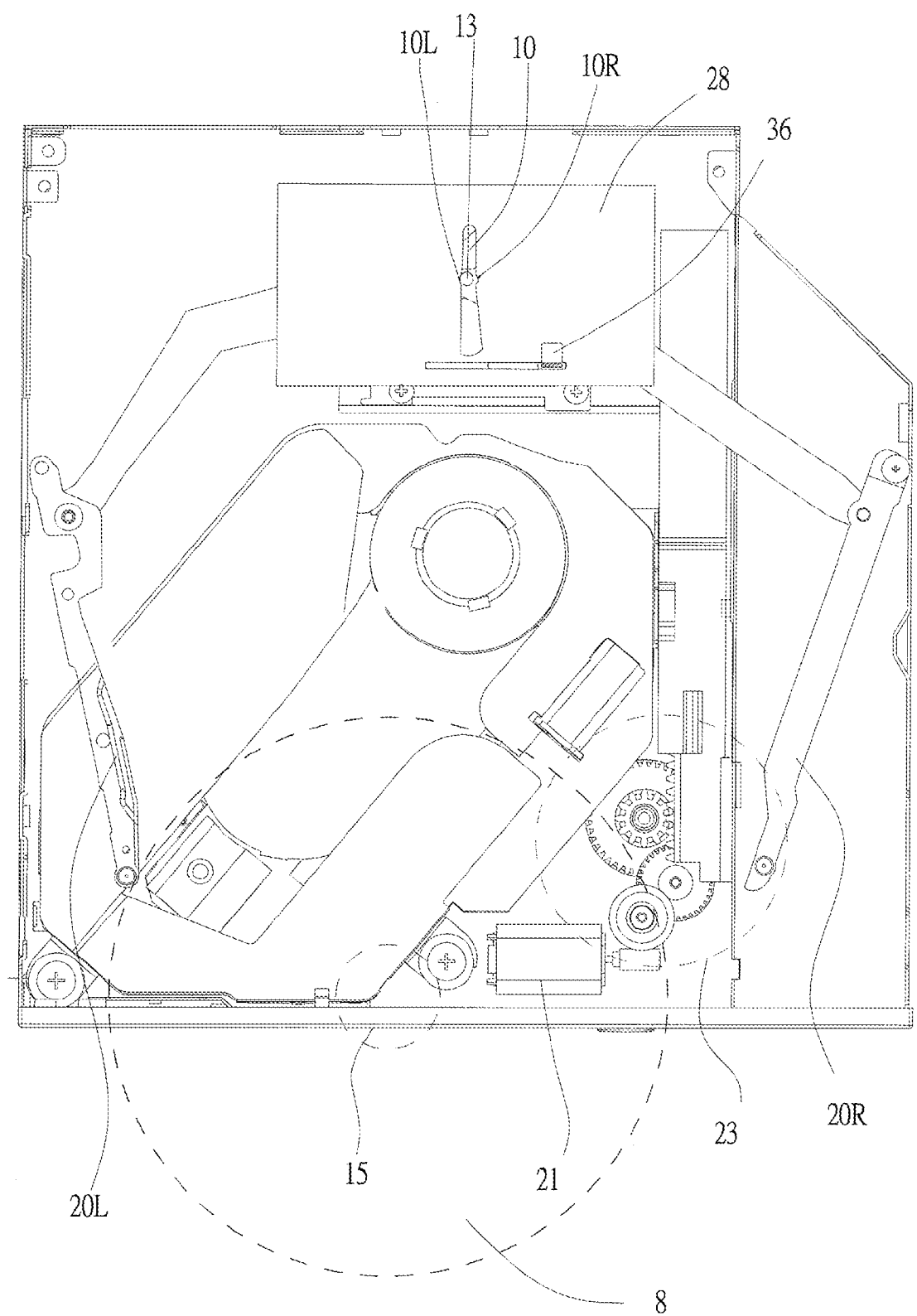
FIG. 5 shows the slot-in optical disk drive in accordance with a first preferred embodiment of the present invention.

Please refer to FIG. 5, which illustrates the structure of the slot-in optical disk drive of the present invention. The slot-in optical disk drive comprises: a slot inlet 15, a motor 21, a transmission unit 23, a slide plate 30 (as shown in FIG. 4), a left loading lever 20L, and a right loading lever 20R. Both the left loading lever 20L and the right loading lever 20R are two-bar linkage with inner ends of two bars thereof being pivoted on a common pivot pin 13. The pivot pin 13 moves along a guide slot 10 that comprises a left recess 10L and a right recess 10R, as shown in FIG. 3. The guide slot 10 is formed on a chassis 28 which is positioned above the slide plate 30.

In a preferred embodiment of the present invention, the left and right recesses are arc-shaped, like a crescent. The slide plate 30 is formed with a first guide track 31 and a second guide track 32 therein, as shown in FIG. 4.

When a user disposes a disk 8, e.g. 8-cm disk, into the slot inlet 15, if he does not put it properly, e.g, he puts it not in the middle of the slot inlet 15 but a little bit to the left or to the right, the pivot pin 13 will be getting stuck in either the left recess 10L, or the right recess 10R, as a result of only one loading lever 20R, or 20L being pushed. Please refer to FIG. 5. When the disk 8 is put somewhat to the left into the slot inlet 15, as only the left loading lever 20L is subjected to the push force, the pivot pin 13 will be stuck in the left recess 10L of the guide slot 10 and unable to move inward along the guide slot 10. The left loading lever 20L is prevented from opening wider. On the other hand, when disk 8 is put somewhat to the right into the slot inlet 15, as only the right loading lever 20R is subjected to the push force, the pivot pin 13 will be stuck in the right recess 10R of guide slot 10 and unable to move downward along the guide slot 10. The right loading lever 20R is prevented from opening wider. Thus the disk 8 demands an extra force to overcome the resistance due to the recess during the loading process, i.e., the user has to exert an extra force to continue pushing the disk 8 into the slot inlet 15 a little bit, the disk 8 will be forced guiding to the proper middle position as a result of the resistance of the recess 10R or 10L. And when the disk 8 is forced into the proper position, the disk 8 will be able to push both the right and left loading levers 20R and 20L, releasing the pivot pin 13 from the confinement of the right recess 10R or the left recess 10L, and so the disk loading process will be carried out smoothly.

Thus, as described above, the slot-in optical disk drive of the present invention can force a manually loaded disk into the proper loading position and completely solve the disk stuck problems as often encountered by prior art slot-in optical disk drives.

The slot-in optical disk drive of the present invention further comprises a plate 40 within. The plate 40 assumes to be at either one of two positions: first position (Position I) or second position (Position II) in the drive. When the plate 40 is at Position I, it shields at least some parts of the recesses 10L, 10R so that the pivot pin 13 can smoothly move along the guide slot 10. When the plate 40 is at Position II, it leaves the recesses 10L, 10R unshielded so that the pivot pin 13 can be stuck by the recesses 10L, 10R in order to guide the disk to the proper position of the slot inlet 15.

Figure 6:
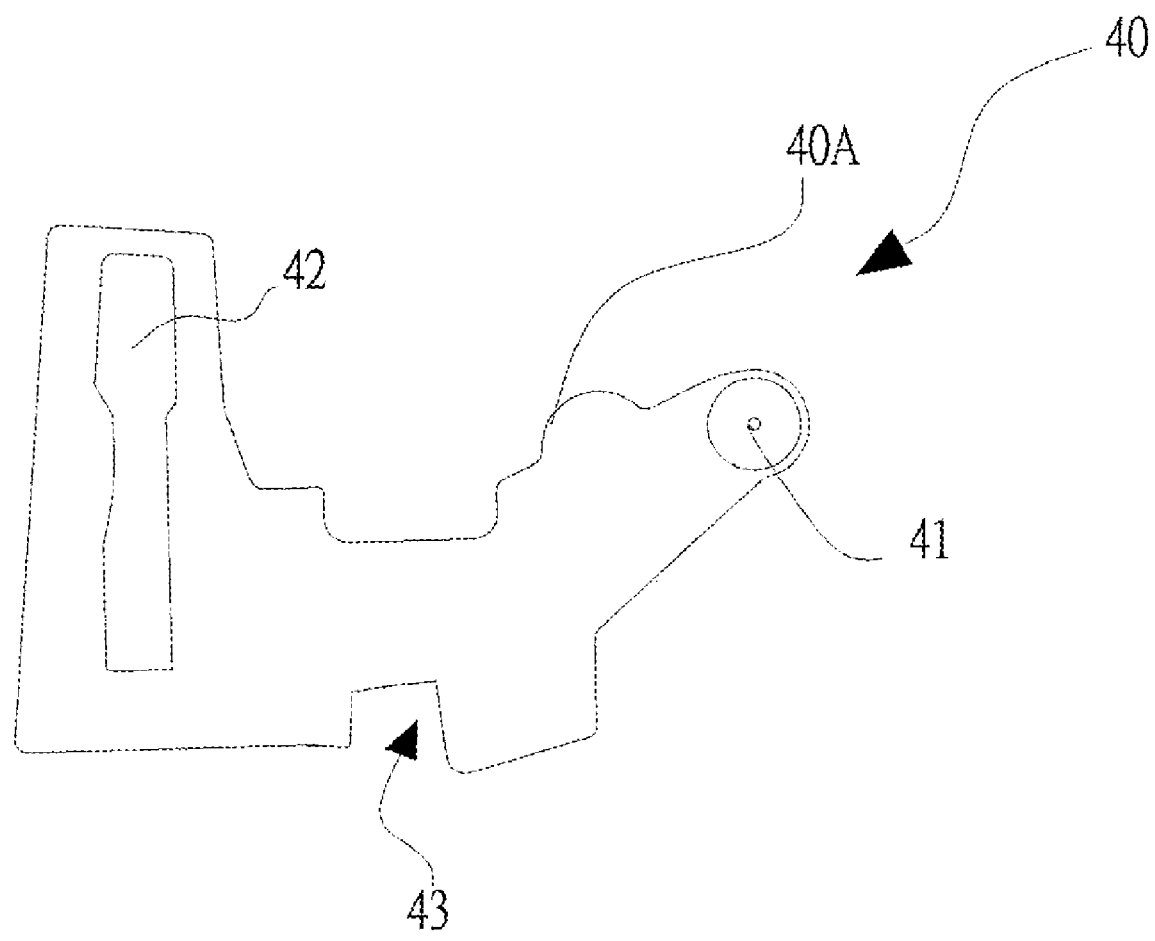
FIG. 6 shows the plate in accordance with a first preferred embodiment of the present invention.
Figure 7:
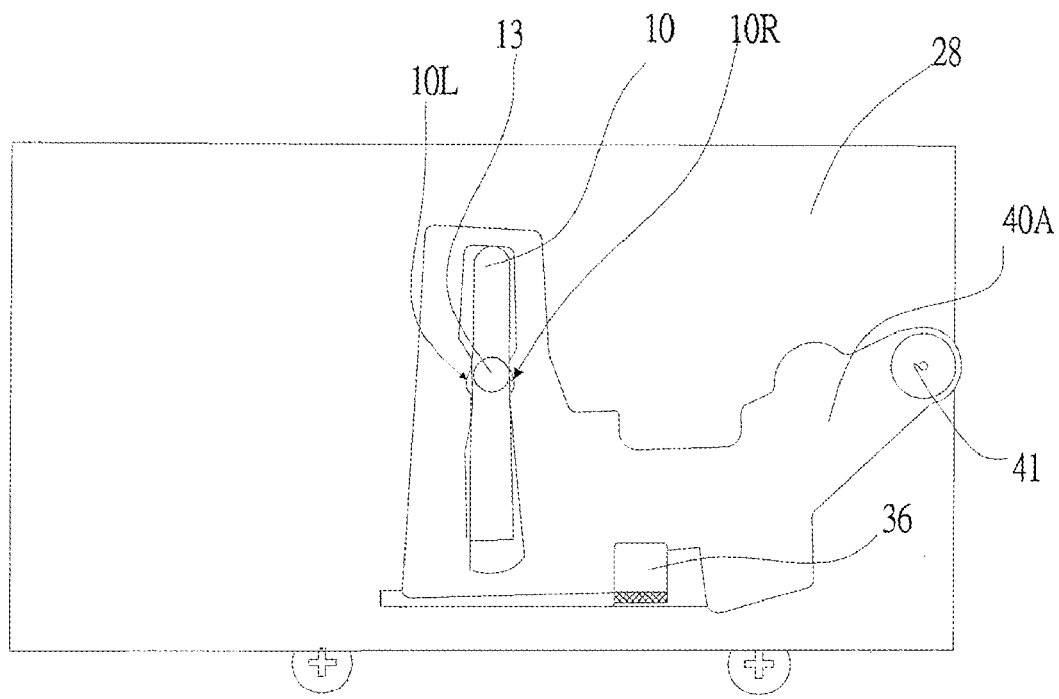
FIG. 7 shows the plate at a first position in accordance with a first preferred embodiment of the present invention.
Figure 8:
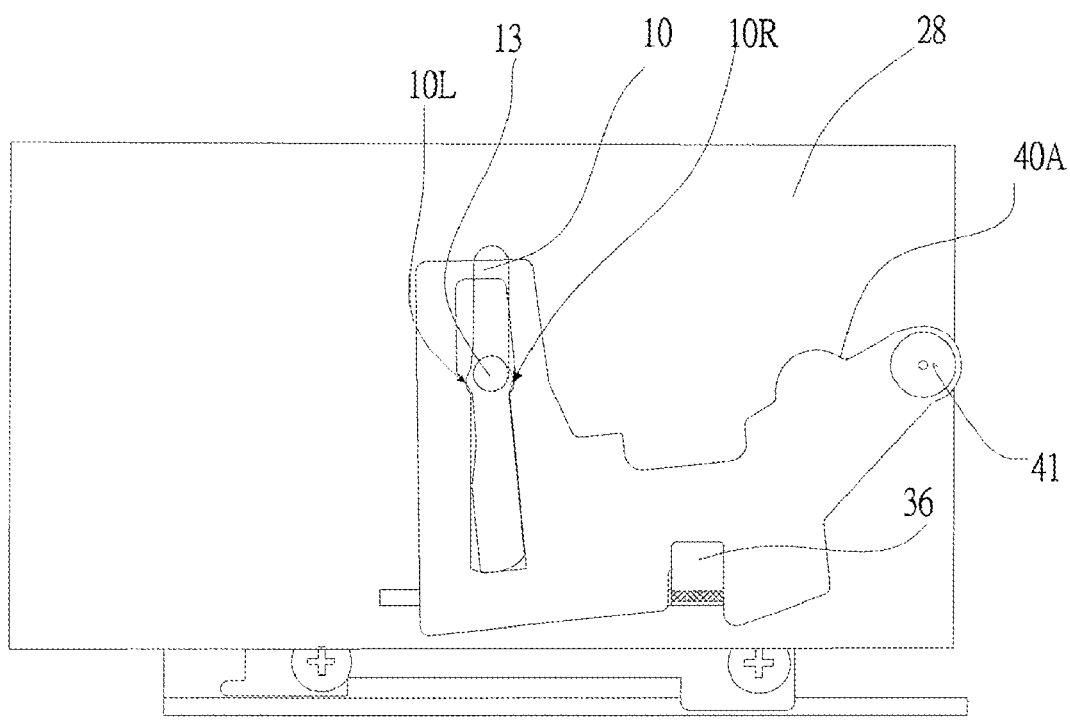
FIG. 8 shows the plate at a second position in accordance with a first preferred embodiment of the present invention.

Please refer to FIG. 6, which illustrates the plate 40 of the first preferred embodiment of the invention. The plate 40 comprises a base 40A, a fulcrum 41, a slim window 42 and an actuating part 43. The base 40A swivels about the fulcrum 41 between Position I and Position II. The width of the first part (the upper section) of the slim window 42 is larger than the maximum width of the guide slot 10, which is the width from farthest edge of the left recess 10L to that of the right recess 10R. As a result, the first part of the slim window 42 can expose the guide slot 10, and the left and right recesses 10L and 10R simultaneously. The width of the second part (the lower section) of the slim window 42 is smaller than the maximum width of the guide slot 10, but is larger than the diameter of the pivot pin 13. Therefore, the slim window 42 can shield the left and right recesses 10L and 10R simultaneously while exposing the guide slot 10 to allow the pivot pin 13 to move smoothly within. Also, in this embodiment of the present invention, there is a bumper 36 attached on one end of the slide plate 30. When the slide plate 30 is driven by the transmission unit 23 to the left, the bumper 36 will drive the actuating part 43 so that the base 40A swivels about the fulcrum 41 and the plate 40 moves from position II (as shown in FIG. 8) to position I (as shown in FIG. 7) and the base 40A covers both the left and right recesses 10L and 10R.

In accordance with the embodiment of the slot-in optical disk drive of the present invention, when the motor 21 is activated, the slide plate 30 is moved to the left by the transmission unit 23 and the plate 40 is moved to Position I to shield the left and the right recesses 10L, 10R. Therefore, when the pivot pin 13 is confined by either the first guide track 31 or the second guide track 32 on the slide plate 30 and moved inward or outward along the guide slot 10, the pivot pin 13 will not be stuck in the left recess 10L or the right recess 10R, but instead, can move smoothly within the guide slot 10.

Figure 9:
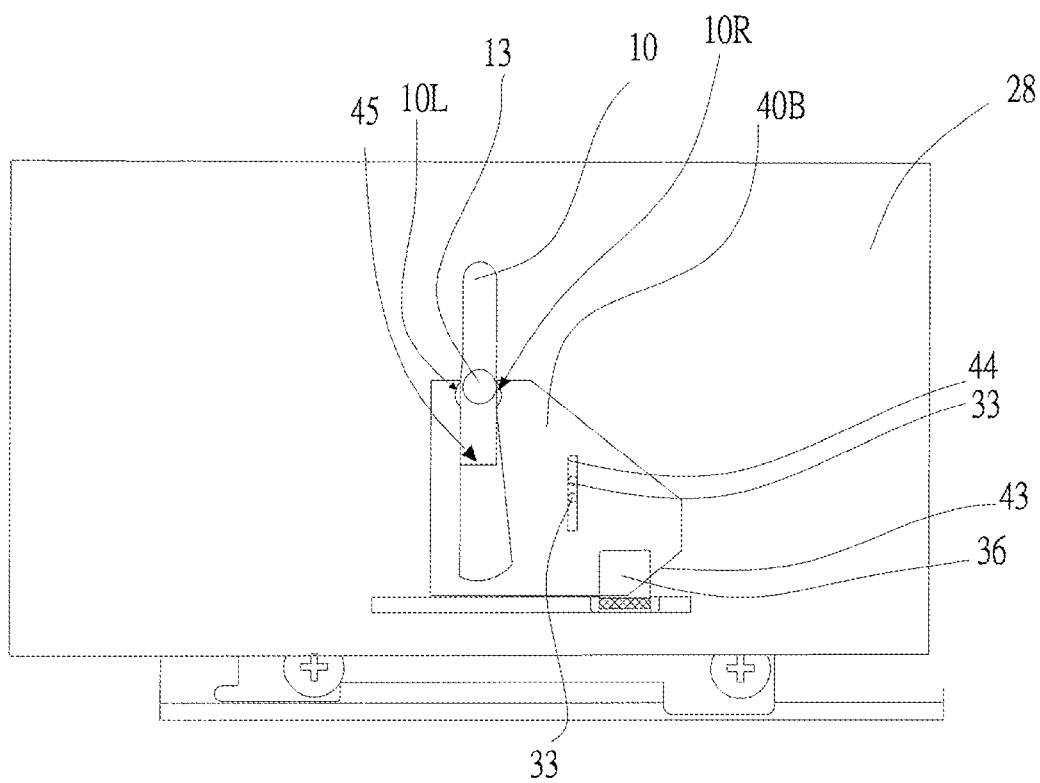
FIG. 9 shows the plate at a first position in accordance with a second preferred embodiment of the present invention.
Figure 10:
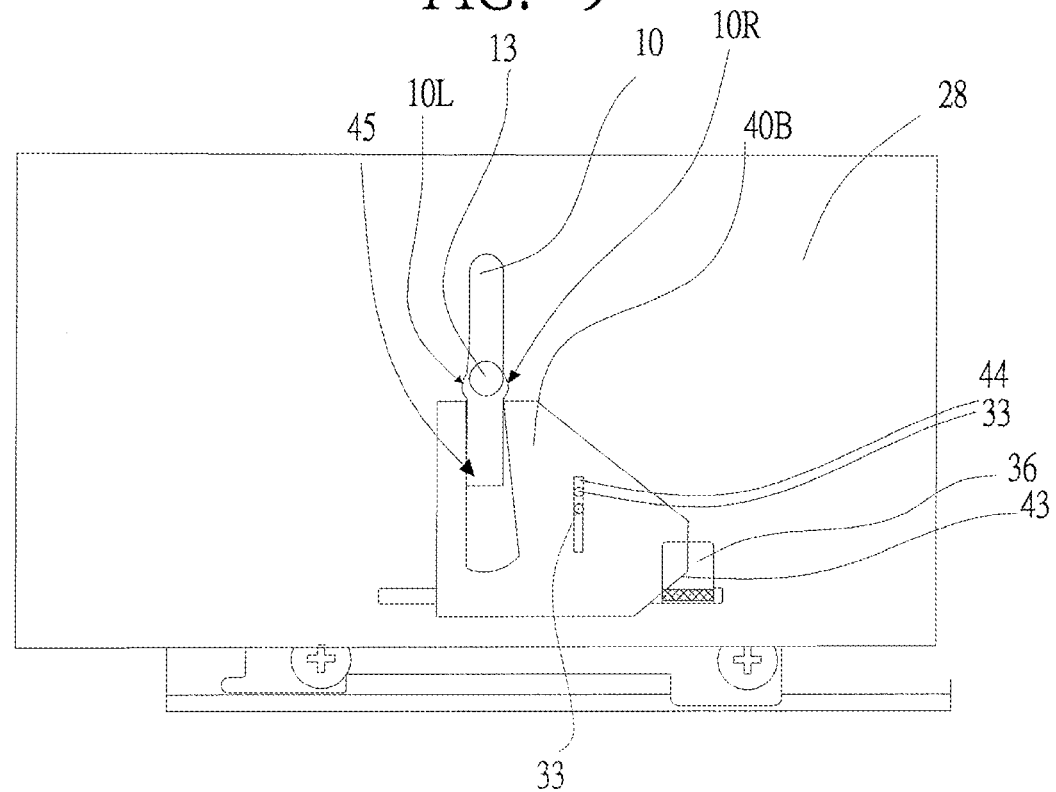
FIG. 10 shows the plate at a second position in accordance with a second preferred embodiment of the present invention.

Please refer to FIG. 9 and FIG. 10, which illustrate the plate of the second embodiment of the present invention. On the base 40B of the plate 40, there is a U groove 45. The U groove 45 has a length only about a half or less of the guide slot 10 so that the two recesses 10L and 10R are completely unshielded as the plate 40 is at a Position II, as shown in FIG. 10, and the U groove 45 can shield the left and right recesses 10L and 10R simultaneously while exposing the guide slot 10 to allow the pivot pin 13 to move smoothly as the plate 40 is at Position I, as shown in FIG. 9. The actuating part 43 of the plate 40 is a slant. On the plate 40 there is also a slit 44 which is in parallel with the guide slot 10 and, in this embodiment, on the slide plate 30 there are also two pillars 33, which are positioned inside the slit 44. The plate 40 is moved linearly because of the pillars 33 and the slit 44. When the slide plate 30 moves to the left, the bumper 36 on the slide plate 30 will push the actuating part 43 of the base 40B so that the plate 40 moves from Position II to Position I.

With this slot-in optical disk drive of the present invention, the plate 40 can also be designed to cover only one of the two recesses on the guide slot, which will also allow the pivot pin to move along the guide slot smoothly without being stuck in the recesses.

Figure 11:
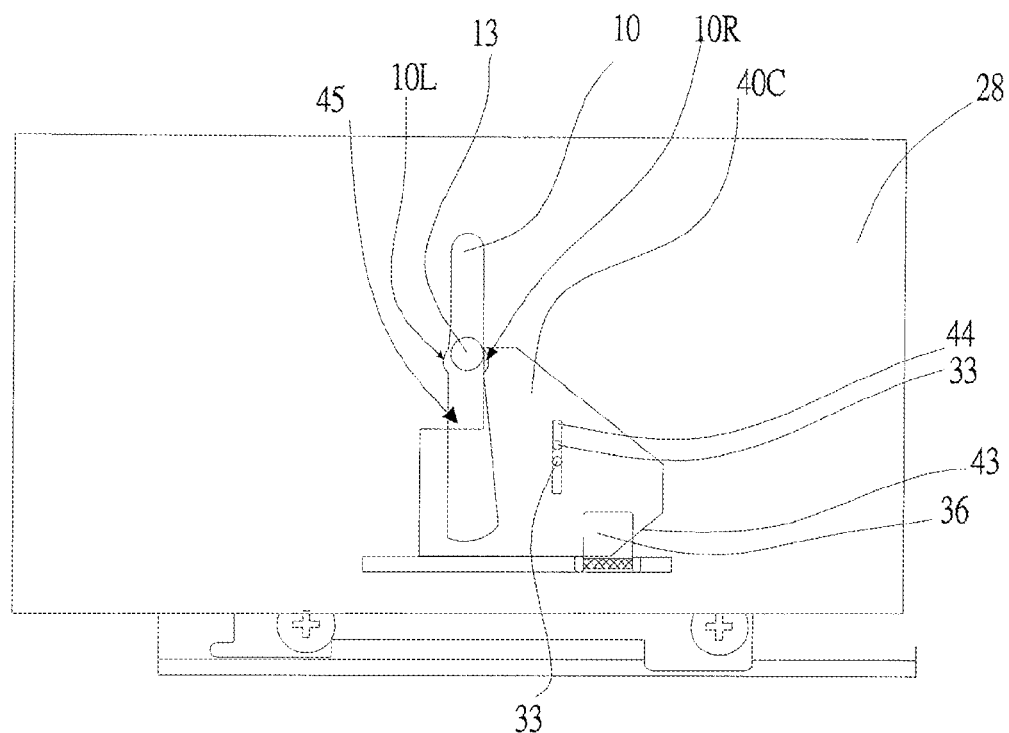
FIG. 11 shows the plate at a first position in accordance with a third preferred embodiment of the present invention.
Figure 12:
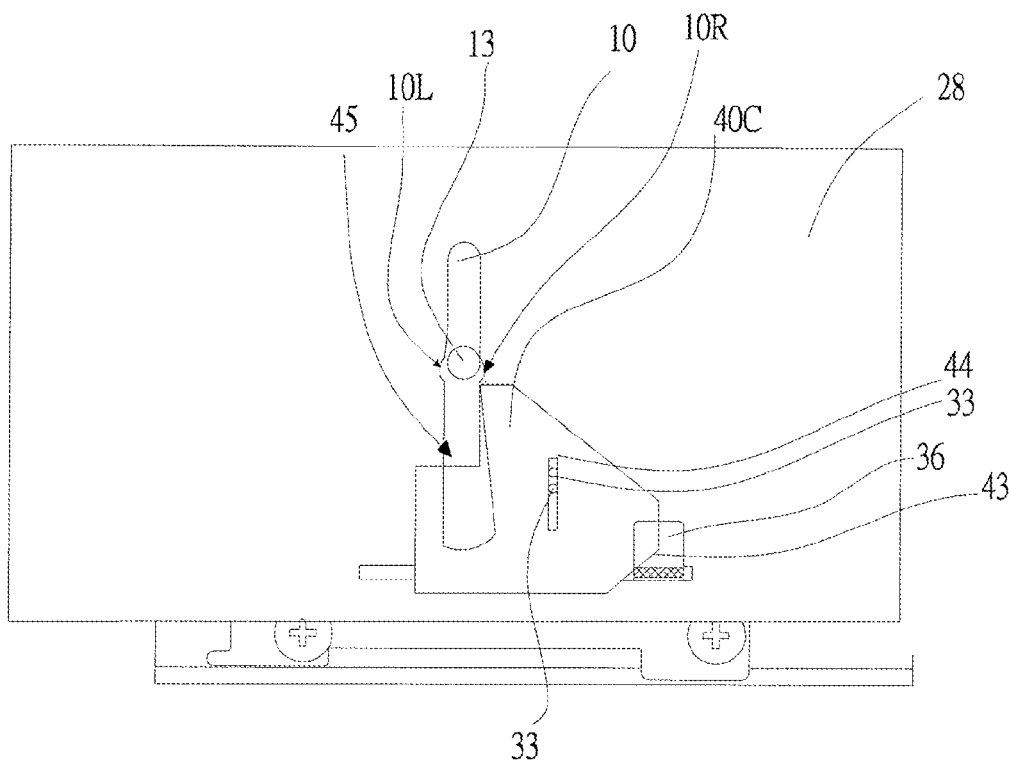
FIG. 12 shows the plate at a second position in accordance with a third preferred embodiment of the present invention.

Please refer to FIG. 11 and FIG. 12, which illustrate the plate 40 of the third embodiment of the present invention. The base 40C of the plate 40 is a modified version of the base 40B (of the second embodiment). The U groove 45 is modified to have a portion cut at a position corresponding to the guide slot 10 and a remaining portion of the U groove 45 can still shield the right recess while the plate 40 is at Position I. FIG. 11 and FIG. 12 respectively illustrates the plate 40 is at Position I and Position II of the third embodiment of the present invention.

Figure 13:
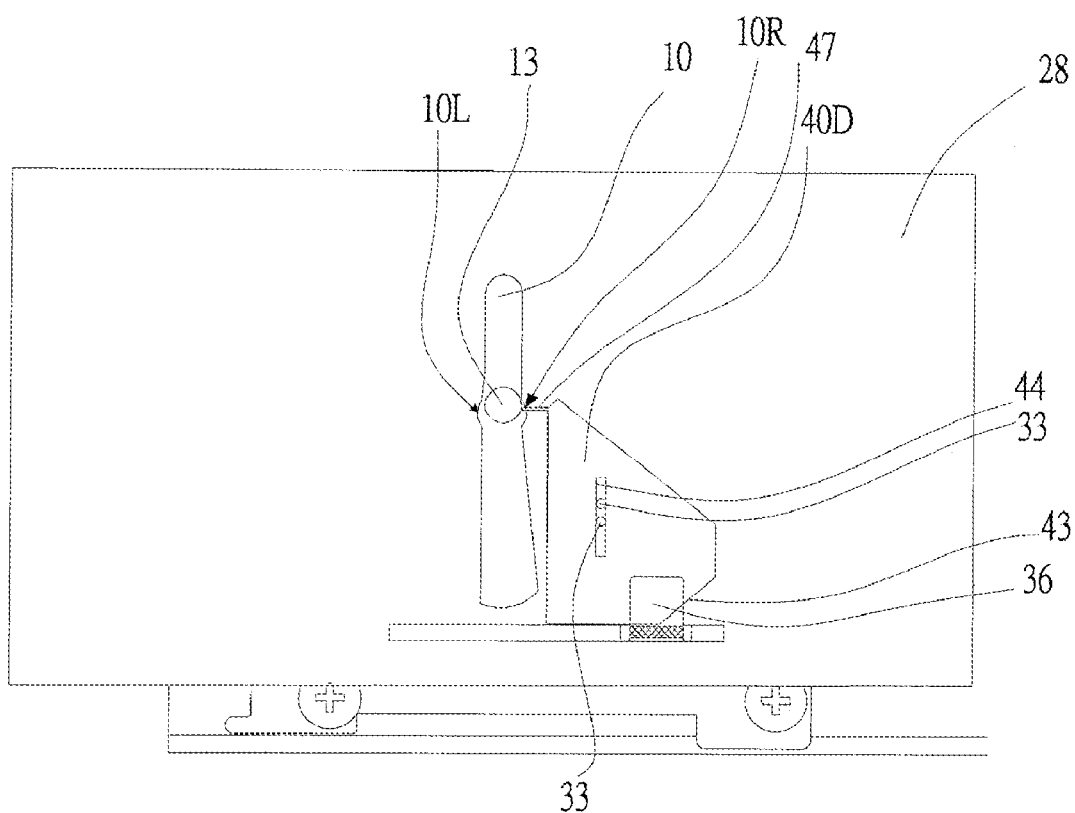
FIG. 13 shows the plate at a first position in accordance with a fourth preferred embodiment of the present invention.

Please refer to FIG. 13, which illustrates the plate 40 of the fourth embodiment of the present invention. The plate 40 comprises a base 40D, a spike 47, a slit 44, and an actuating part 43. When the slide plate 30 moves to the right or to the left, it will carry the plate 40 to move inward or outward, with the spike 47 shielding part of the right recess 10R, which allows the pivot pin 13 to move in the guide slot 10 without being stuck in the recess.

According to the above embodiments of the present invention, the shape of the plate may be in arbitrary and can swivel, move linearly, or in any other ways between Position I and Position II. Moreover, when the plate is at Position I, it shields at least a part of the recesses on the guide slot, allowing the pivot pin to move smoothly in the guide slot, and when the plate is at Position II, it shields no part of the recesses on the guide slot, allowing the disk to be guided to the proper loading position.

As is understood by a person skilled in the art, the foregoing preferred embodiments of the present invention are just illustrations, rather than limiting descriptions, of the present invention. It is intended to cover various modifications and similar arrangements included within the spirit and scope of the appended claims, the scope of which should be accorded the broadest interpretation so as to encompass all such modifications and similar structures.

What is claimed is:

1. A disk loading device of a slot-in optical disk drive comprising:
    two loading levers for loading and ejecting an optical disk, said two loading levers are pivoted on a pivot pin;
    a guide slot formed on a chassis, said guide slot having a right recess and a left recess, wherein said pivot pin moves along said guide slot; and
    a plate, said plate shields at least some portion of said right recess or said left recess while said plate is located at a first position and said plate does not shield any portion of said right recess and said left recess while said plate is located at a second position.

2. The disk loading device of a slot-in optical disk drive according to claim 1 further comprises a slide plate moved by a transmission unit, said slide plate has a first guide track and a second guide track formed therein and when said pivot pin is guided along said first guide track or said second guide track in accordance with a size of said optical disk, said pivot pin is confined in said guide slot.

3. The disk loading device of a slot-in optical disk drive according to claim 2 wherein said slide plate further comprises a bumper to push said plate moving to said first position from said second position.

4. The disk loading device of a slot-in optical disk drive according to claim 1 wherein said plate has a fulcrum so that said plate swivels about said fulcrum and thus said plate is at said first position or said second position.

5. The disk loading device of a slot-in optical disk drive according to claim 1 wherein said plate has a slim window and a width of a first portion of said slim window is larger than the maximum width of said guide slot and a width of a second portion of said slim window is smaller than the maximum width of said guide slot and is larger than the diameter of said pivot pin so that said plate can shield at least a portion of said left recess and said right recess but said pivot pin can move smoothly in said guide slot.

6. The disk loading device of a slot-in optical disk drive according to claim 1 wherein said plate is moved linearly between said first position and said second position.

* * * * *